(12) United States Patent
Yang et al.

(10) Patent No.: US 12,200,231 B2
(45) Date of Patent: Jan. 14, 2025

(54) NEAREST NEIGHBOR SEARCH METHOD, APPARATUS, DEVICE, AND STORAGE MEDIUM

(71) Applicant: GUANGDONG OPPO MOBILE TELECOMMUNICATIONS CORP., LTD., Guangdong (CN)

(72) Inventors: Fuzheng Yang, Guangdong (CN); Lihui Yang, Guangdong (CN); Zexing Sun, Guangdong (CN); Shuai Wan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 171 days.

(21) Appl. No.: 17/851,808

(22) Filed: Jun. 28, 2022

(65) Prior Publication Data

US 2022/0329833 A1 Oct. 13, 2022

Related U.S. Application Data

(63) Continuation of application No. PCT/CN2020/070555, filed on Jan. 6, 2020.

(51) Int. Cl.
*H04N 19/196* (2014.01)
*H04N 19/119* (2014.01)
(Continued)

(52) U.S. Cl.
CPC ......... *H04N 19/197* (2014.11); *H04N 19/119* (2014.11); *H04N 19/132* (2014.11); *H04N 19/167* (2014.11); *H04N 19/597* (2014.11)

(58) Field of Classification Search
CPC .. H04N 19/197; H04N 19/119; H04N 19/132; H04N 19/167; H04N 19/597
See application file for complete search history.

(56) References Cited

U.S. PATENT DOCUMENTS

| 2018/0144545 | A1 | 5/2018 | Legrand et al. |
| 2019/0080483 | A1 | 3/2019 | Mammou et al. |
| 2020/0021856 | A1* | 1/2020 | Tourapis ................ H04N 19/13 |

FOREIGN PATENT DOCUMENTS

| CN | 106126919 A | 11/2016 |
| CN | 109257604 A | 1/2019 |

(Continued)

OTHER PUBLICATIONS

International Search Report and Written Opinion with English Translation for PCT Application PCT/CN2020/070555 mailed Sep. 28, 2020. (11 pages).

(Continued)

*Primary Examiner* — On S Mung
(74) *Attorney, Agent, or Firm* — Young Basile Hanlon & MacFarlane, P.C.

(57) ABSTRACT

Described is a nearest neighbor search method. The method is applicable in a device and comprises: acquiring a Morton code set of point cloud data to be searched; stratifying the point cloud data on the basis of the Morton code set and of a first distance threshold to produce current stratum data; shifting to the right by a first preset digit Morton codes of prediction data other than the stratified data in the point cloud data to produce a corresponding first parent node set; determining, on the basis of Morton codes of the current stratum data, a neighbor area satisfying a criterion in the first parent node set; and determining a nearest neighboring point set of the current stratum data in the neighboring area. Also provided in an exemplary embodiment of the present application are a device and a computer storage medium.

16 Claims, 8 Drawing Sheets

(51) Int. Cl.
    *H04N 19/132*     (2014.01)
    *H04N 19/167*     (2014.01)
    *H04N 19/597*     (2014.01)

(56) References Cited

FOREIGN PATENT DOCUMENTS

| | | | |
|---|---|---|---|
| CN | 109345619 A | 2/2019 | |
| CN | 109889840 A | 6/2019 | |
| CN | 110418135 A | 11/2019 | |

OTHER PUBLICATIONS

Apple Inc., Efficient implementation of the Lifting Scheme in TMC13, International Organisation for Standardisation Organisation Internationale De Normalisation Coding of Moving Pictures and Audio, ISO/IEC JTC1/SC29/WG11 MPEG2018/m43781, Jul. 2018. (107 pages).

Extended European Search Report for EP Application 20912986.5 mailed Jan. 25, 2023. (10 pages).

Yang et al., [G-PCC][new proposal] A neighbour search method for predlift transform, Xidian University, Northwestern Polytechnical University, Guangdong OPPO Mobile Telecommunications Corp., Ltd, Jan. 2020. (6 pages).

ISO/IEC JTC 1/SC 29/WG 11, N18891, Coding of moving pictures and audio Convenorship: UNI (Italy), 3DG, Dec. 13, 2019. (74 pages).

\* cited by examiner

NEAREST NEIGHBOR SEARCH METHOD, APPARATUS, DEVICE, AND STORAGE MEDIUM

CROSS-REFERENCE TO RELATED APPLICATION(S)

The present application is a continuation application of International PCT Application No. PCT/CN2020/070555, filed on Jan. 6, 2020, the entire content of which is hereby incorporated by reference.

TECHNICAL FIELD

The present application relates to the field of video encoding, and relates to, but is not limited to, a method and apparatus and device for nearest neighbor search, and a storage medium.

BACKGROUND

In related technologies, after a Level of Detail (LOD) of point cloud attribute is partitioned, every time one LOD is partitioned, a nearest neighbor search is performed on the current LOD once. The search method is that for a set arranged in an ascending order of Morton codes, points corresponding to Morton codes around a Morton code of a first point of points of which the Morton codes are larger than a Morton code of a current point are searched for; then a distance between each point in the range and the current point is calculated, to obtain three nearest neighbors.

Because Morton codes cannot reflect a space distance between the two points well and there is a periodic jump point in the Morton codes, adjacency of the Morton codes cannot ensure proximity of spatial positions, it is inaccurate to search for a nearest neighbor of the point around the Morton code corresponding to the first point. Moreover, according to a size of a search range, the performance and efficiency change greatly, so search of the nearest points cannot be performed adaptively.

SUMMARY

In view of this, exemplary embodiments of the present application provide a method and apparatus and device for nearest neighbor search, and a storage medium, to solve at least one problem in related technologies.

A technical solution of an exemplary embodiment of the present application is implemented as follows.

A method for nearest neighbor search is provided in an exemplary embodiment of the present application, which includes: acquiring a Morton code set of point cloud data to be searched; according to the Morton code set and a first distance threshold, hierarchizing the point cloud data to obtain data of a current level; performing right shift of a Morton code of prediction data other than hierarchized data in the point cloud data to by first preset digits to obtain a corresponding first parent node set; according to a Morton code of the data of the current level, determining a neighbor region that satisfies a condition in the first parent node set; and determining a set of nearest neighbor points of the data of the current level in the neighbor region.

An apparatus for nearest neighbor search is provided in an exemplary embodiment of the present application, which includes: a first acquisition module which is configured to acquire a Morton code set of point cloud data to be searched; a first hierarchizing module which is configured to hierarchize the point cloud data according to the Morton code set and a first distance threshold to obtain a data of a current level; a first right shift module which is configured to perform right shift of a Morton code of prediction data other than hierarchized data in the point cloud data by first preset digits to obtain a corresponding first parent node set; a first determination module which is configured to determine, according to a Morton code of the data of the current level, a neighbor region that satisfies a condition in the first parent node set; and a second determination module which is configured to determine a set of nearest neighbor points of the data of the current level in the neighbor region.

Correspondingly, a device for nearest neighbor search is provided in an exemplary embodiment of the present application, including a memory and a processor, wherein the memory stores a computer program which is runnable on the processor, and the processor implements acts in the above method for nearest neighbor search when executing the program.

A computer readable storage medium is provided in an exemplary embodiment of the present application, on which a computer program is stored, wherein when the computer program is executed by a processor, acts in the method for nearest neighbor search provided in the above embodiments are implemented.

Exemplary embodiments of the present application provide a method and apparatus and device for nearest neighbor search, and a storage medium, wherein, Morton codes of point cloud data are hierarchized to obtain data of a current level; then, a neighbor region that satisfies a condition is determined based on Morton codes of the data of the current level, and a set of nearest neighbor points of the data of the current level is determined in the neighbor region. In this way, a neighbor region is searched by Morton codes of the data of the current level, and on the premise that the neighbor region can be accurately searched out, a range of searching nearest neighbors is reduced, thereby reducing the number of times of calculating a distance.

DETAILED DESCRIPTION

A technical solution in an exemplary embodiment of the present application will be clearly and completely described below in conjunction with a drawing in an exemplary embodiment of the present application.

In an exemplary embodiment of the present application, there is provided a method for nearest neighbor search, which is applied to a mobile device with a front camera function or a rear camera function. The mobile device may be implemented in various forms. For example, a mobile device described in an exemplary embodiment of the present application may include a mobile phone, a tablet computer, a palmtop computer, a Personal Digital Assistant (PDA), and the like. Moreover, a function implemented by the method may be implemented by a processor in a mobile device by invoking program codes. Of course, the program codes may be stored in a computer storage medium. It can be seen that the mobile device at least includes a processor and a storage medium.

Figure 1:
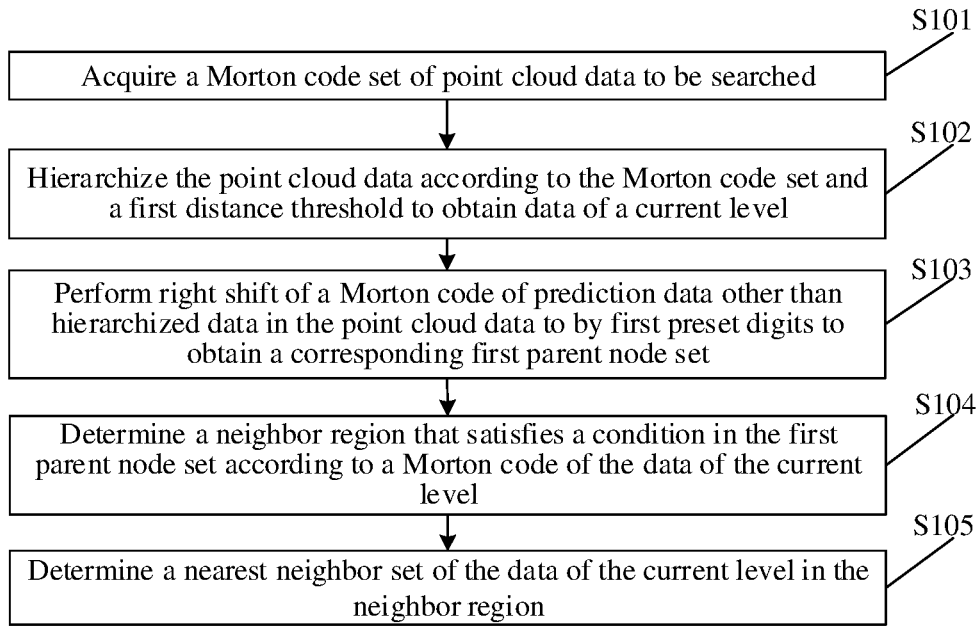
FIG. 1 is a schematic flow chart of an implementation of a method for nearest neighbor search according to an exemplary embodiment of the present application.

FIG. 1 is a schematic flow chart of an implementation of a method for nearest neighbor search according to an exemplary embodiment of the present application. As shown in FIG. 1, the following description is made in conjunction with FIG. 1.

In act S101, a Morton code set of point cloud data to be searched is acquired.

Herein, the point cloud data to be searched may be understood as point cloud data that need to determine a nearest neighbor. For example, in a process of point cloud data compression, a Morton code set of the point cloud data is determined first. In some possible implementations, firstly, point cloud data to be searched are obtained, for example, point cloud data for forming 3D video. Then, Morton codes of the point cloud data are determined. For example, a binary encoding bitstream of the point cloud data may be determined first, and the Morton codes of the point cloud data may be determined based on the binary encoding bitstream. Finally, the Morton codes of the point cloud data are arranged in an ascending order to obtain a Morton code set containing a plurality of Morton codes. In other embodiments, the Morton codes of the point cloud data may also be arranged in a descending order to obtain a Morton code set containing a plurality of Morton codes; or the Morton codes of point cloud data may be arranged in any specific order (for example, an order arbitrarily set, an order in which the largest is at the middle and values decrease in sequence towards two ends, etc.) to obtain a Morton code set. That is to say, arrangement of Morton codes in the Morton code set is orderly.

In act S102, according to the Morton code set and a first distance threshold, the point cloud data is hierarchized to obtain data of a current level.

Herein, according to the first distance threshold, a point of which the distance to a current point is less than the first distance threshold is selected from the Morton code set to obtain the data of the current level. The first distance threshold gradually increases every time one level of data is partitioned, that is, a first distance threshold used when data of a next level of the current level is partitioned is larger than the first distance threshold used for the data of the current level. In other words, a density of the data of the next level of the data of the current level is smaller than a density of the data of the current level.

In some possible implementations, firstly, a second set at least containing a point corresponding to a Morton code arranged in the first is determined according to the Morton code set.

For example, a point corresponding to a Morton code arranged in the first in a Morton code set in which Morton codes are arranged in the ascending order is taken as a point in an initial second set.

Secondly, if a distance between the current point currently being processed in the point cloud data and a point in the second set is less than or equal to the first distance threshold, the current point is put into the first set; wherein, an initial first set is an empty set.

For example, points which are nearer to the current point are determined from the Morton code set, that is, a density of points in the first set is larger. A distance between a point corresponding to a Morton code arranged in the second in the Morton code set and each of all the points in the second set is determined. If any distance is less than or equal to the first distance threshold, the current point is put into the first set.

Thirdly, if the distance between the current point and the point in the second set is greater than the first distance threshold, the current point is put into the second set to obtain an updated second set.

In a specific example, points are traversed in an order of Morton codes. For a current point P which is being traversed, it is determined whether a distance between P and a point in a second set O(k) is less than or equal to the first distance threshold. If the distance is less than or equal to the first distance threshold, P is put into a first set L(k), otherwise P is put into the O(k). When the distance between P and a point of the O(k) is determined, if there are more than 128 points in the O(k), only 128 points at the end of the O(k) may be used to determine whether distances between the point P and these points, respectively, are greater than the first distance threshold, to determine whether the point P is put into the first set or the second set. In this way, by determining distances between the current point and a preset number of points arranged at the end of the second set, respectively, whether the current point should be put into the first set or the second set may be determined to reduce a complexity. Since the points arranged at the end of the second set are nearer to a Morton code of the current point, a final neighbor region thus obtained is more likely to contain a nearest neighbor.

Finally, a point in the updated second set of which the distance from the current point is less than or equal to the second distance threshold is determined to obtain data of a current level.

In some possible implementations, the updated second set may contain a plurality of points, and points in the point cloud data of which the distances from a point in the second set is less than the first distance threshold are taken as data of a first level. Then, distances between remaining points in the point cloud data and points in the updated second set are traversed in turn, points of which the distances are less than the second distance threshold are taken as data of a second level, and a second set which is updated again is obtained. Next, distances between remaining points in the point cloud data and points in the second set which is updated again are traversed in turn, and points, of which the distances are less than another distance threshold which is greater than the second distance threshold, are taken as data of a third level, and so on; until the point cloud data are partitioned into data of multiple levels.

In act S103, a Morton code of prediction data other than hierarchized data in the point cloud data is shifted to the right by first preset digits to obtain a corresponding first parent node set.

Herein, shifting the Morton code of the prediction data other than the hierarchized data in the point cloud data to the right by the first preset digits can be understood as expanding a range corresponding to the Morton code of the prediction data by multiple times. For example, the first preset digits are 3, expanding times are $2^3$. Therefore, the first parent node set is a Morton code set of right-shifted prediction data.

In act S104, according to a Morton code of the data of the current level, a neighbor region that satisfies a condition is determined in the first parent node set.

Herein, the neighbor region that satisfies the condition can be understood as a neighbor region near the current parent node. In this way, searching the neighbor region by a Morton code can narrow a search range on the premise that a nearest neighbor in the region can be accurately searched out.

In act S105, a set of nearest neighbor points of the data of the current level is determined in the neighbor region.

Herein, a set of nearest neighbor points is determined for data of each level. The set of nearest neighbor points may contain nearest neighbors of a specific amount, for example, the set of nearest neighbor points contains three nearest neighbors. In some possible implementations, firstly, a distance between a point in a neighbor region and a point in the data of the current level is determined to obtain a distance set. For example, there are 50 points in the data of the current level, and distances between the 50 points and the point in the neighbor region are determined respectively to obtain a distance set. Then, a target distance that is less than a third distance threshold is determined from the distance set. In some embodiments, the third distance threshold may be set as a relatively small value, and the third distance threshold is smaller than the first distance threshold. In a specific example, N target distances (N is an integer greater than 0, such as N is 3) that are smallest may be determined from the distance set. Finally, according to points corresponding to the target distances, a set of nearest neighbor points of the current point is determined. For example, points corresponding to the N target distances are taken as the set of nearest neighbor points of the current point. Alternatively, several points with smaller distances are determined from the points corresponding to the N target distances as the set of nearest neighbor points of the current point. For example, from the points corresponding to the target distances, points corresponding to the smallest distance values, which satisfy a preset number, are determined to obtain the set of nearest neighbor points of the current point. In a specific example, from the points corresponding to the target distances, three points corresponding to smallest distance values are determined to obtain the set of nearest neighbor points of the current point. In this way, the nearest neighbors are accurately searched out, and an encoding performance of the point cloud data is improved. In some embodiments, if the distance set does not contain a target distance that is less than the third distance threshold, point arranged at a preset position(s) are determined from the second set to form a set of nearest neighbor points of the current point. For example, N nearest points (e.g. 3) arranged before and after the current point are taken to form the set of nearest neighbor points.

In an exemplary embodiment of the present application, a neighbor region is searched by Morton codes of the data of the current level, and on the premise that the neighbor region can be accurately searched out, a range for searching for a nearest neighbor is reduced, thereby reducing the number of times of calculating a distance and achieving better encoding performance and efficiency.

Figure 2A:
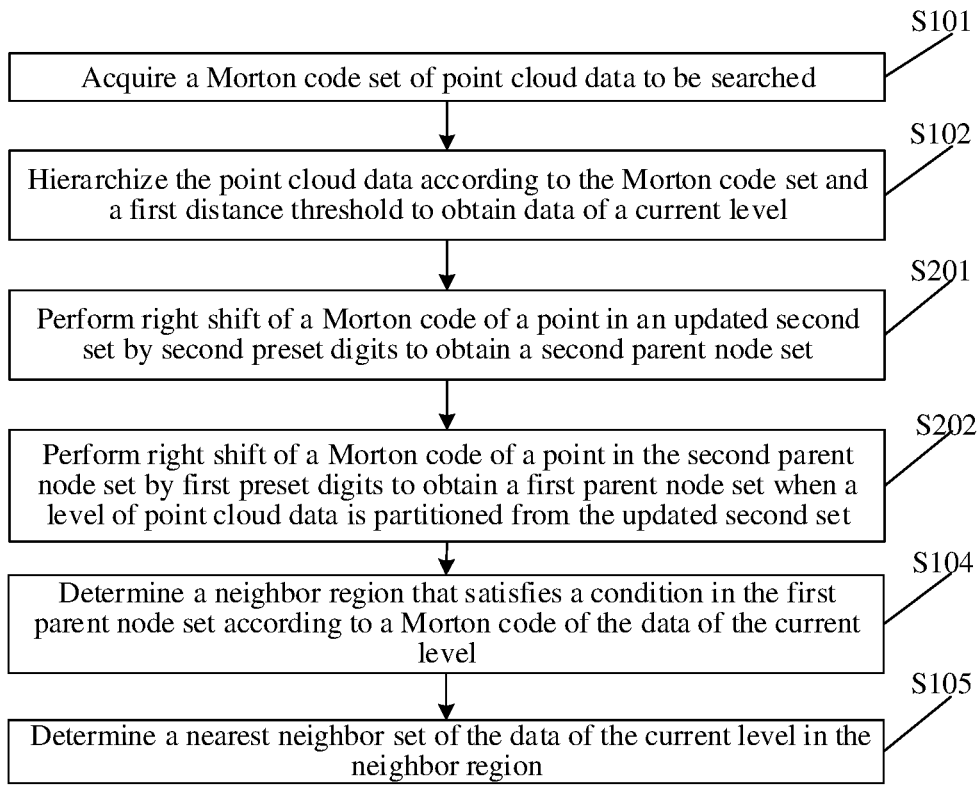
FIG. 2A is a schematic flow chart of another implementation of a method for nearest neighbor search according to an exemplary embodiment of the present application.

In some embodiments, in order to ensure the high-efficiency of the search range, the act S103 may be realized by the following acts, as shown in FIG. 2A, which is a schematic flow chart of another implementation of a method for nearest neighbor search according to an exemplary embodiment of the present application. The following description is made in conjunction with FIG. 1.

In act S201, a Morton code of a point in the updated second set is shifted to the right by second preset digits to obtain a second parent node set.

Herein, a Morton code of each of the points in the updated second set is shifted to the right by the second preset digits to obtain the second parent node set. In a specific example, the second preset digits may be taken as N, e.g., 3. The first preset digits and the second preset digits may be the same or different. A way for determining the first preset digits is as follows. Firstly, a Morton code set is sampled according to a preset interval to obtain a sample set; for example, the Morton code set is sampled at equal intervals, and 100 points are sampled as the sample set. Secondly, Morton codes of points in the sample set are shifted to the right by first preset digits to obtain a sampling parent node set. For example, Morton codes of these samples are shifted to the right by 3 digits each time to obtain a sampling parent node set of the right-shifted Morton codes. Thirdly, neighbors other than the samples in the region corresponding to the sampling parent node set are determined. For example, the number of neighbors in a sampling parent node is determined, that is, the number of other points in a region corresponding to the parent node other than the samples. Finally, if an average number of neighbors in the sampling parent node set is greater than a preset average threshold, it is to determine that the first preset digits are the same as the second preset digits. In a specific example, a preset average threshold may be set as 1. If the average number of neighbors in the sampling parent node is greater than 1, it may be understood that each sample has at least one neighbor in the parent node region, in this case, it is to determine that the first preset digits are the same as the second preset digits.

In act S202, when a level of point cloud data is partitioned from the updated second set, a Morton code of a point in the second parent node set is shifted to the right by first preset digits to obtain a first parent node set.

Herein, every time a level of point cloud data is partitioned, the second set is updated once, and Morton codes of points in the updated second set are shifted to the right by the first preset digits. For example, when a first level of point cloud data is partitioned, a second set is obtained, and each Morton code in the second set is shifted to the right by first preset digits; then, when a second level of point cloud data is partitioned, the second set is updated (that is, the number of points in the second set is increased), and Morton codes in the updated second set are shifted to the right again by the first preset digits; and a first parent node set corresponding to each level of point cloud data is obtained.

In an exemplary embodiment of the present application, Morton codes in the updated second set are shifted to the right every time one level of point cloud data is partitioned, so that the first parent node set corresponding to each level of point cloud data can be more accurately determined, thereby achieving high-efficiency of a search range determined based on the first parent node set.

Figure 2B:
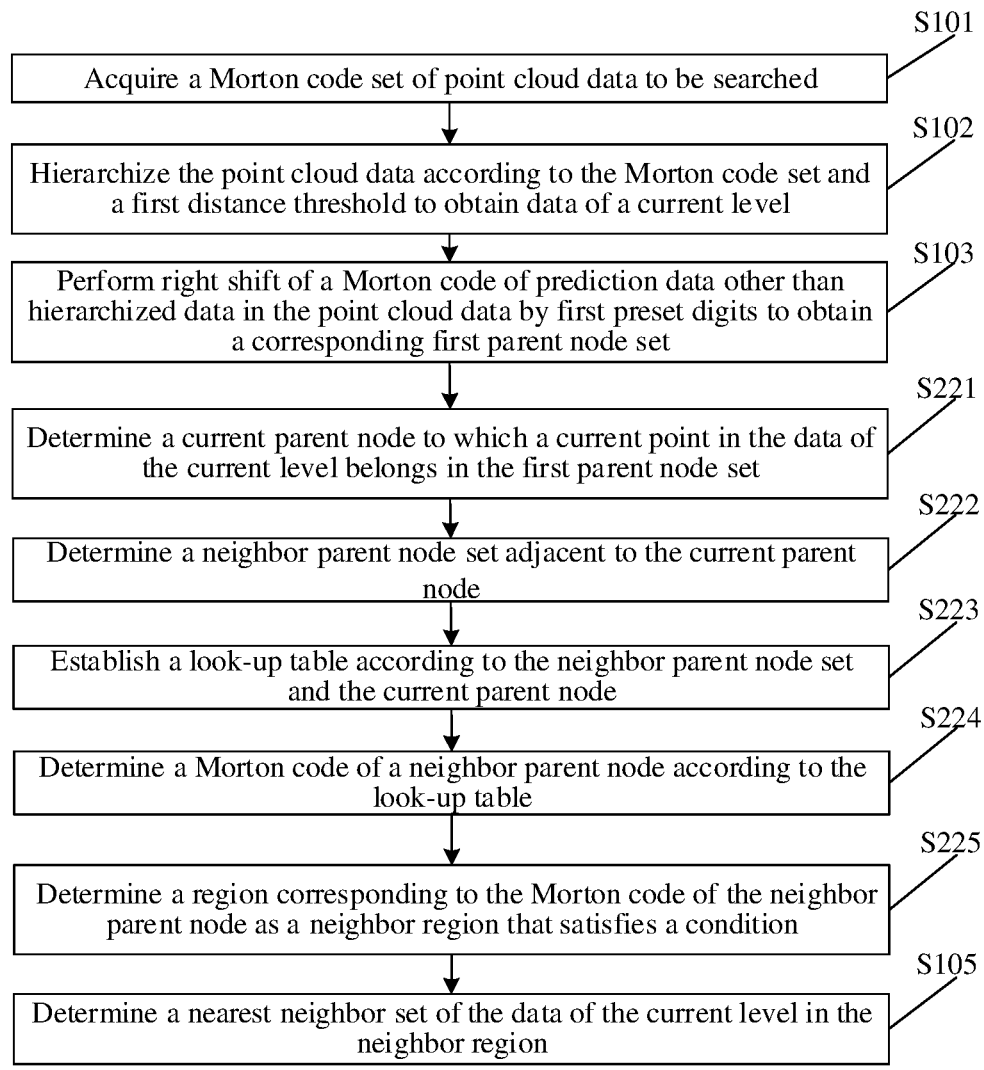
FIG. 2B is a schematic flow chart of yet another implementation of a method for nearest neighbor search according to an exemplary embodiment of the present application.

In some embodiments, in order to improve efficiency of the determined neighbor region, the act S104 may be realized by the following acts, as shown in FIG. 2B, which is a schematic flow chart of yet another implementation of a method for nearest neighbor search according to an exemplary embodiment of the present application. The following description is made in conjunction with FIG. 1.

In act S221, a current parent node to which the current point in the data of the current level belongs in the first parent node set is determined.

Herein, a parent node to which each point in the data of the current level belongs in the first parent node set is determined.

In act S222, a neighbor parent node set adjacent to the current parent node is determined.

Figure 7:
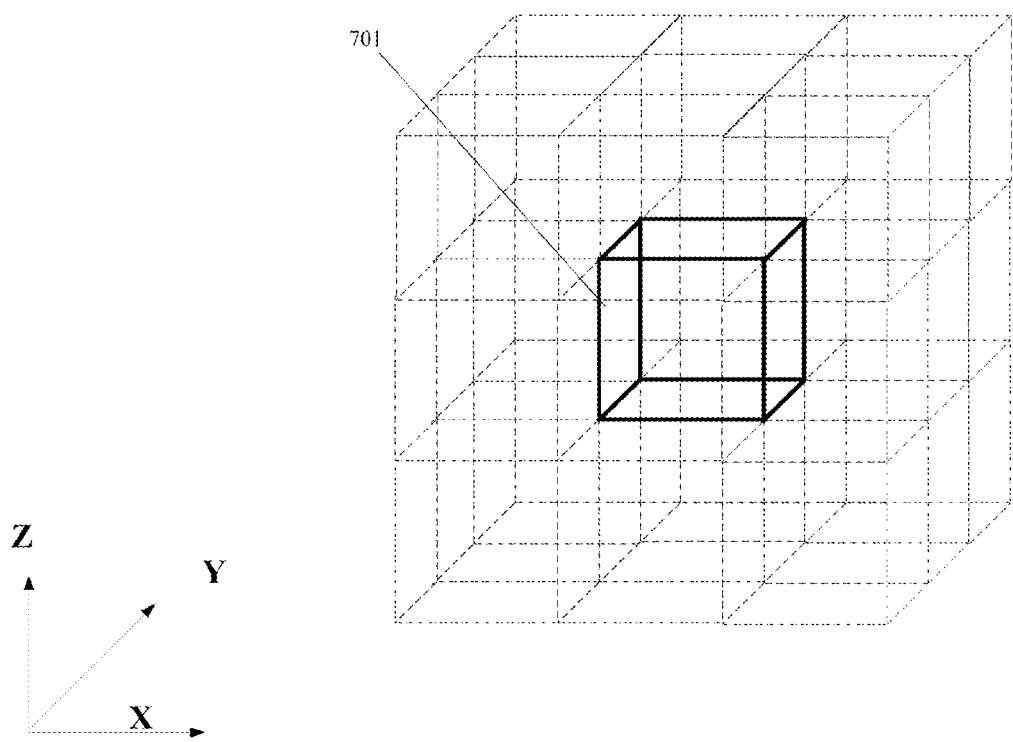
FIG. 7 is a schematic diagram of an application scenario of a method for nearest neighbor search according to an exemplary embodiment of the present application.

Herein, a neighbor parent node set surrounding and adjacent to the current parent node is determined. As shown in FIG. 7, a block 701 is a parent node of a currently predicted point P. For the current parent node, there are 26 adjacent neighbor parent nodes. In addition to 27 neighbor parent nodes including the neighbor parent node itself, neighbor parent nodes coplanar, collinear and co-point with the neighbor parent node, a range of neighbor parent nodes may be expanded or reduced. In this way, the number of neighbors may be expanded outward.

In act S223, a look-up table is established according to the neighbor parent node set and the current parent node.

Herein, the look-up table may indicate a corresponding relationship between the current parent node and the neighbor parent node set, and is used to determine the Morton code of the neighbor parent node.

In act S224, a Morton code of a neighbor parent node is determined according to the look-up table.

In some embodiments, establishing the look-up table may be accomplished in the following multiple modes.

In a first mode, firstly, a difference between a coordinate value of a neighbor parent node and a coordinate value of the current parent node is determined to obtain a difference set.

For example, a difference between three-dimensional coordinates of each neighbor parent node and three-dimensional coordinates of the current parent node is determined to obtain a difference set.

Then, a look-up table is established according to the difference set and a belonging relationship between the neighbor parent node set and the current parent node.

Herein, the belonging relationship is used to indicate that the neighbor parent node set is adjacent to the current parent node. Since each difference corresponds to a neighbor parent node, and each neighbor parent node has a current parent node to which the neighbor parent node belongs, the look-up table is established in this way, and three-dimensional coordinates of a neighbor parent node may be determined based on the difference in the look-up table and the known three-dimensional coordinates of the current parent node, thereby obtaining the Morton code of each neighbor parent node.

In a second mode, according to the belonging relationship and a distance value from a center point of the neighbor parent node set to a center of the current parent node, the look-up table is established.

In some possible implementations, a weight of a neighbor node may be modified as a specific value, and a table looking-up approach may be used, which can reduce a complexity of an algorithm. For example, a weight of each neighbor is set as a distance value from a center point of the neighbor parent node to the current point. Taking the distance value as the weight and in conjunction with the belonging relationship, the look-up table is established. Thereby, the three-dimensional coordinates of the neighbor parent node may be obtained based on the distance value in the look-up table and the coordinate value of the current parent node, and then the Morton code of the neighbor parent node may be obtained.

In a third mode, firstly, according to the Morton code of the neighbor parent node and the Morton code of the current parent node, a Hamming distance between the neighbor parent node and the current parent node and a Morton code difference between the neighbor parent node and the current parent node are determined. Then, the look-up table is established according to the Hamming distance, the Morton code difference and the belonging relationship. In this way, after the look-up table is established, the Morton code of the neighbor parent node may be obtained based on the look-up table and the known coordinate value of the current parent node.

In act S225, a region corresponding to the Morton code of the neighbor parent node is determined as a neighbor region that satisfies a condition.

Herein, a region occupied by the Morton code of the neighbor parent node is determined as the neighbor region that satisfies the condition. For example, firstly, in the second set, an arrangement number of a Morton code of a neighbor parent node is determined in the second set; then, according to the arrangement number, a region corresponding to the Morton code of the neighbor parent node is determined; finally, at least part of the region occupied by the Morton code of the neighbor parent node is taken as the neighbor region. For example, a whole region occupied by a Morton code of a neighbor parent node is taken as a neighbor region, or a part of the region occupied by the Morton code of the neighbor parent node is taken as the neighbor region. In this way, after the neighbor region is obtained, an order of searching for the nearest neighbors may be in an order from itself, coplanar, collinear to co-point with itself. For multiple neighbors in this region, the neighbors may be selected according to distribution of spatial positions, and three neighbors uniformly distributed in the space may be selected to avoid a situation in which three neighbors are on the same side of the predicted point, so that the set of nearest neighbor points searched is more accurate.

Figure 3:
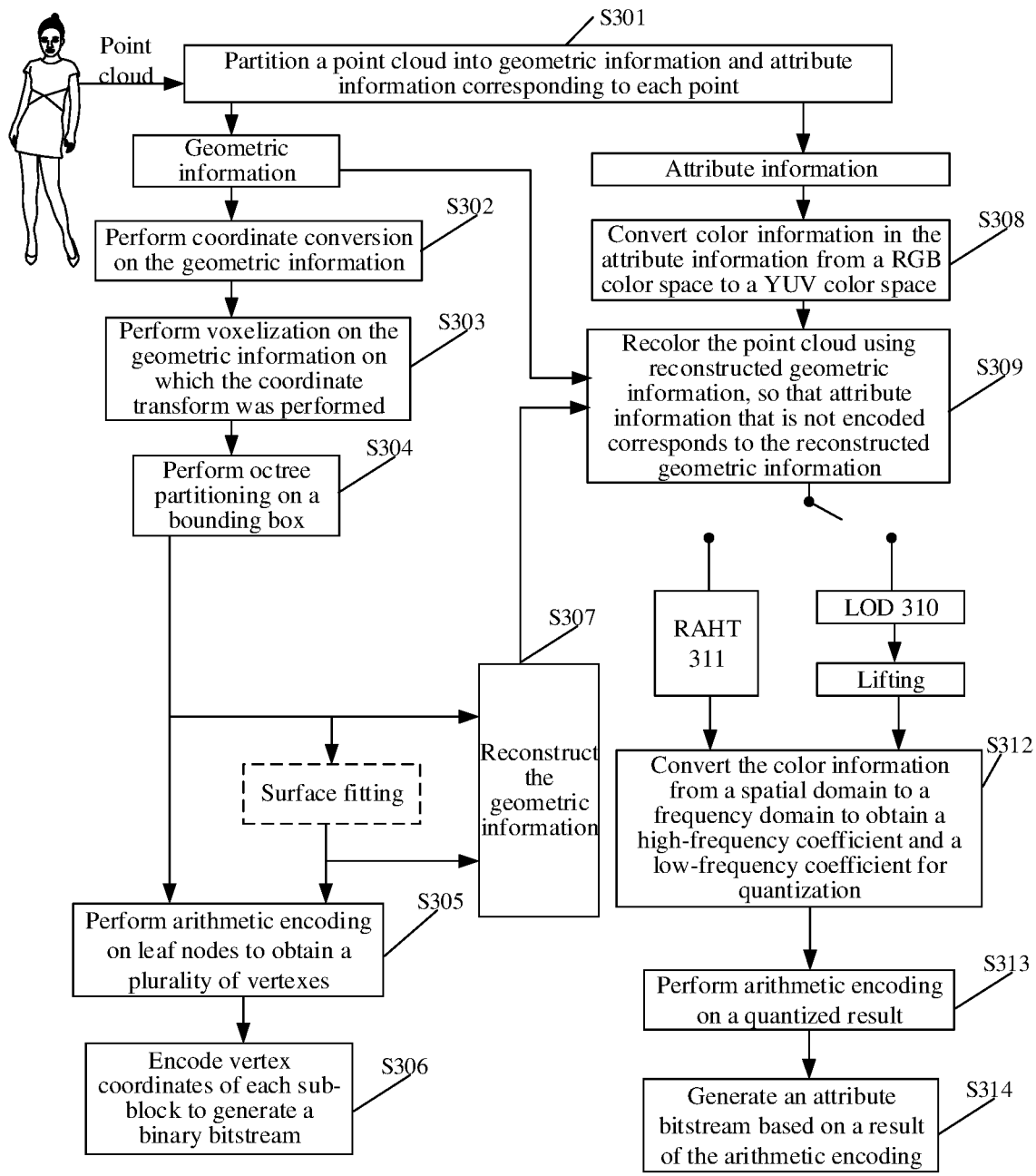
FIG. 3 is a schematic flow chart of point cloud compression according to an exemplary embodiment of the present application.

In the related art, a flow of point cloud compression is shown in FIG. 3, which is a schematic flow chart of point cloud compression according to an exemplary embodiment of the present application. The following description is made in conjunction with acts shown in FIG. 3.

In act S301, a point cloud is partitioned into geometric information and attribute information corresponding to each point.

Herein, in a Geometry-based Point Cloud Compression (G-PCC) encoder framework, geometry information of a point cloud and attribute information corresponding to each point of the point cloud are encoded separately.

In act S302, coordinate conversion is performed on the geometric information.

Herein, coordinate conversion is performed on the geometric information, so that the whole point cloud is contained in a bounding box.

In act S303, voxelization is performed on the geometric information on which the coordinate conversion was performed.

Herein, performing voxelization on the geometric information on which the coordinate conversion was performed may be understood as quantization of geometric information on which the coordinate conversion was performed. This act of quantization mainly plays the role of scaling. Because of quantization rounding, geometric information of some points is the same, and it is decided whether to remove repeated points according to a parameter.

In act S304, octree partitioning is performed on the bounding box.

Herein, octree partitioning is performed on the bounding box. In an octree-based geometric information encoding framework, the bounding box is partitioned equally into eight sub-cubes, and a non-empty sub-cube (including points in a point cloud) is continued to be partitioned into eight equal parts, until leaf nodes obtained through partitioned are 1×1×1 unit cubes, then points in the leaf nodes are encoded to generate a binary bitstream.

In act S305, arithmetic encoding is performed on leaf nodes to obtain a plurality of vertexes.

Herein, the leaf nodes are surface-fitted for geometric reconstruction of the binary bitstream of the obtained geometric information. In a triangle soup (trisoup)-based geometry information encoding framework, octree partitioning will also be performed first. However, different from the octree-based geometry information encoding, in the trisoup-based geometry information encoding, a point cloud does not need to be partitioned step by step into unit cubes of 1×1×1, but partitioned into sub-blocks (blocks) with a side length of W and at this time the partitioning is stopped. Based on a surface formed by distribution of a point cloud in each sub-block, at most twelve vertexes generated by the surface and twelve edges of the sub-block are obtained. Vertex coordinates of each block are encoded in turn to generate a binary bitstream.

In act S306, vertex coordinates of each sub-block are encoded to generate a binary bitstream.

Herein, the vertex coordinates of each sub-block are encoded to generate a geometric bitstream.

The acts S301 to S306 accomplish an encoding process of geometric information. After the geometric encoding is accomplished, the geometric information is reconstructed, and the process proceeds to act S307.

In act S307, the geometric information is reconstructed.

Herein, reconstruction of the geometric information may be understood as decoding an encoded bitstream and re-obtaining decoded geometric information, that is, reconstructed geometric information.

In an exemplary embodiment of the present application, attribute encoding is mainly performed for color information.

In act S308, color information in the attribute information is converted from a RGB color space to a YUV color space.

In act S309, the point cloud is recolored by using reconstructed geometric information, so that attribute information that is not encoded corresponds to the reconstructed geometric information.

Herein, in color information encoding, there are mainly two transform approaches, one approach is that distance-based lifting transform which depends on Level of DetaiL (LOD) partitioning is achieved in an LOD partitioning generation module 310, and the other approach is a Region Adaptive Hierarchal Transform (RAHT) 311 which is directly performed. In any one of the two approaches, color information is converted from a spatial domain to a frequency domain to obtain a high-frequency coefficient and a low-frequency coefficient through conversion. Finally, the coefficients are quantized and encoded to generate a binary bitstream. FIG. 1 is a framework diagram of a G-PCC encoder.

In act S312, the color information is converted from a spatial domain to a frequency domain to obtain a high-frequency coefficient and a low-frequency coefficient for quantization.

In act S313, arithmetic encoding is performed on a quantized result.

In act S314, an attribute bitstream is generated based on a result of the arithmetic encoding.

In some embodiments, LOD partitioning is used in two point cloud attribute transforms, predicting and lifting. A distance-based LOD partitioning is described in detail below.

A process of generating LOD is that by a set of different distance thresholds $(d_l)_{l=0\ldots L-1}$ set by the user an original input point cloud is partitioned into different detail levels $(R_l)_{l=0\ldots L-1}$. Note the distance threshold $(d_l)_{l=0\ldots L-1}$ needs to meet the following two conditions:

$$d_l < d_{l-1}, \text{ and}$$

$$d_{L-1} = 0 \qquad (1);$$

A process of LOD partitioning is definite, it is after geometry reconstruction of the point cloud, at this time geometric coordinate information of the point cloud may be obtained. The process of LOD partitioning is applied to a point cloud encoder and a point cloud decoder at the same time. A specific process of LOD partitioning is as follows.

1) All points are marked as an "unvisited" point set, and a "visited" point set (represented by V) is initialized as an empty set.
2) This algorithm process is continuous iterations. A generation process of a detail level R, corresponding to each iteration l is as follows.

In a first act, the algorithm iteratively traverses all points.

In a second act, if a current point has been traversed, this point is ignored.

In a third act, otherwise, a nearest distance D from the point to a set V is calculated.

In a fourth act, if the nearest distance D is greater than or equal to a threshold $d_l$, this point is added to the detail level $R_l$ and the set V.

In a fifth act, the process is iterated continuously until all points are traversed.

3) An lth LOD set, that is, $LOD_l$ is obtained by combining points in the detail levels $R_0, R_1, \ldots, R_l$.
4) The process is iterated continuously until all LODs are generated or all points are traversed.

Figure 4:
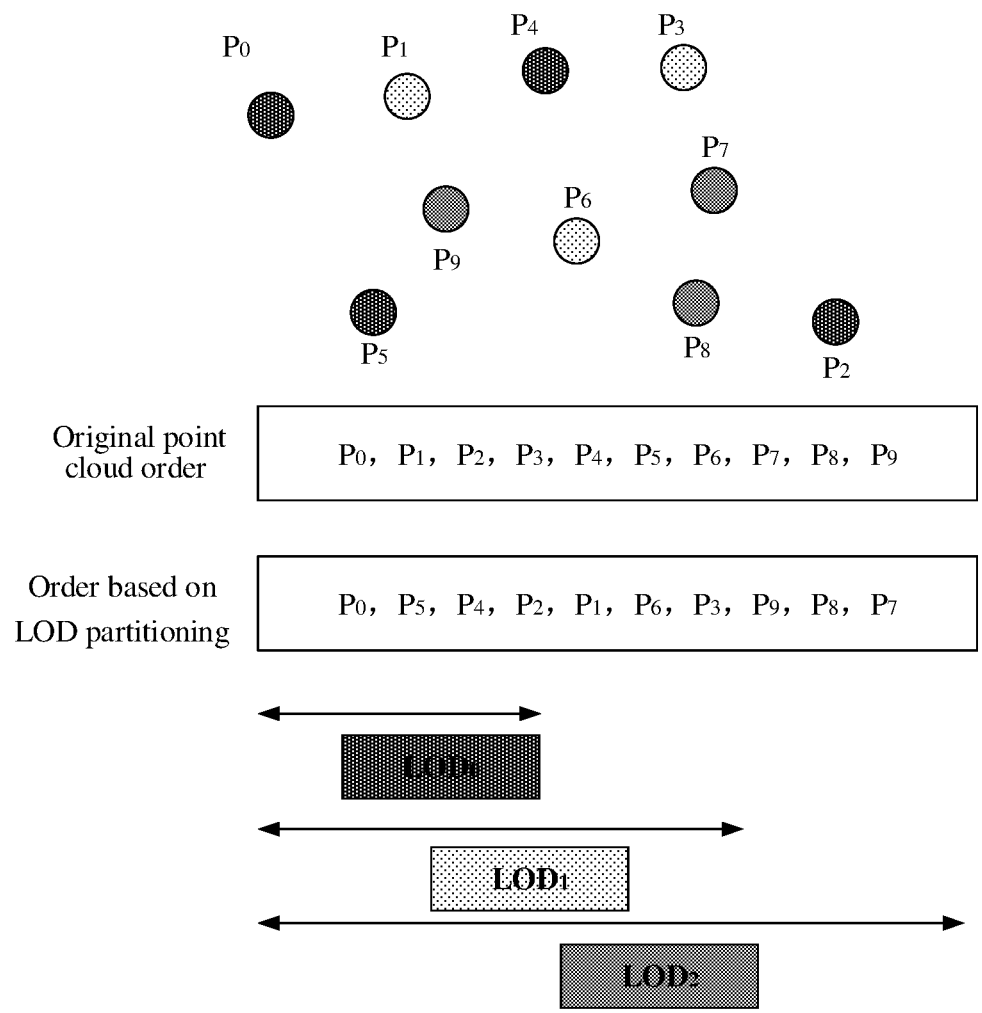
FIG. 4 is a schematic diagram of a structure of generated data of levels according to an exemplary embodiment of the present application.

A process of generating the LOD is shown in FIG. 4, which is a schematic diagram of a structure of generated data of levels according to an exemplary embodiment of the present application. The points P0 to P9 are points at different positions in the point cloud data, and an original order of these points is: P0, P1, P2, P3, P4, P5, P6, P7, P8, P9. After LOD partitioning of these points according to the above 1) to 4), three levels of data are obtained, namely, a first level is LOD0: P0, P5, P4 and P2; a second level is LOD1: P0, P5, P4, P2, P1, P6 and P3; and a third level is LOD2: P0, P5, P4, P2, P1, P6, P3, P9, P8 and P7.

On the basis of generating the LOD, a solution for reducing a computational complexity of generating the LOD is provided, that is, LODs are partitioned based on a Morton order. Compared with an original searching for all points to partition LOD, the computational complexity of the solution is greatly reduced. The main acts are as follows.

First, assumed that variable $(P_i)_{i=1...N}$ saves an original input point cloud, variable $(M_i)_{i=1...N}$ is a Morton value associated with each point. And D0 and ρ are two initial parameters set by the user, respectively, and are used as parameters for partitioning LOD distance thresholds, where ρ>1. A specific approach of calculating a Morton code is described as follows: for a three-dimensional coordinate of which each component is represented by a d-digit binary number, its three components may be represented by formula (2) as follows:

$$x = \sum_{l=1}^{d} 2^{d-l} x_l, \quad y = \sum_{l=1}^{d} 2^{d-l} y_l, \quad z = \sum_{l=1}^{d} 2^{d-l} z_l; \quad (2)$$

Where, $x_l, y_l, z_l \in \{0,1\}$ are binary values corresponding to the most significant digit (l=1) to the least significant digit (l=d) of x, y and z respectively. The Morton code M is obtained by sequentially and alternatively arranging $x_l, y_l, z_l$ starting from the most significant digit to the least significant digit of x, y and z, M is calculated as shown in the following formula (3):

$$M = \sum_{l=1}^{d} 2^{3(d-l)}(4x_l + 2y_l + z_l) = \sum_{l'}^{3d} 2^{3d-l'} m_{l'}; \quad (3)$$

Where $M_i \in \{0,1\}$ are values from the most significant digit (l'=1) to the least significant digit (l'=3d) of M. After the Morton code M of each point in the point cloud is obtained, the points in the point cloud are arranged in an order of Morton codes from small to large. Indexes of all points are stored in a variable I, and the algorithm iterates continuously. In a kth iteration, points belonging to a kth LOD will searching for their nearest neighbors from a LOD0 level to a LODk−1 level. A specific process of the algorithm is as follows.

Firstly, a sampling distance $D=D_0$ is initialized.

Secondly, in the kth iteration, k=0, 1 . . . N−1 (N is the total number of levels of LOD partitioning). The variable L(k) saves points belonging to the kth level LOD, and the variable O(k) belongs to a point set of a higher level than the kth LOD level. Herein, a process of calculating L(k) and O(k) is as follows.

In a first act, firstly, O(k) and L(k) are initialized.

The L(k) is initialized as an empty set; the O(k) is initialized to an empty set.

In a second act, points are traversed in an order of indexes of points saved in a variable I during each iteration. Distances from the current point to all points within a certain range in the set O(k) are calculated for each traversal. Based on the Morton order value corresponding to the current point, search is performed in a search range SR1 of the set O(k) (SR1 represents the search range based on Morton order, generally being 8, 16, 64). If a distance from the current point less than a threshold dl is searched out in this range, the current point is added to the set L(k), otherwise, the current point is added to the set O(k).

Thirdly, during each iteration, the sets L(k) and O(k) are calculated respectively, and points in the O(k) will be used as prediction points of points in the set L(k). Assuming that a set R(k)=L(k)\L(k−1), wherein R(k) represents a point set of a difference between LOD(k−1) set and LOD(k) set. For points in the set R(k), the nearest h predicted neighbors (at present h is set to 3) will be searched in the set O(k). A specific process for searching for nearest neighbors is as follows.

In a first act, a Morton code corresponding to a point Pi in the set R(k) is Mi.

In a second act, an index j of a point arranged in the first in points larger than the Morton order value Mi corresponding to the current point Pi is searched for in the set O(k).

In a third act, a set of nearest neighbor points of the current point Pi is searched for in a search range [j−SR2, j+SR2] of the set O(k) based on the index j (SR2 represents a search range, and its value is generally 8, 16, 32, or 64). In this range, three nearest neighbors of Pi are obtained by calculating distances.

Fourthly, iteration is performed continuously until all the points in the set I are traversed.

Figure 5:
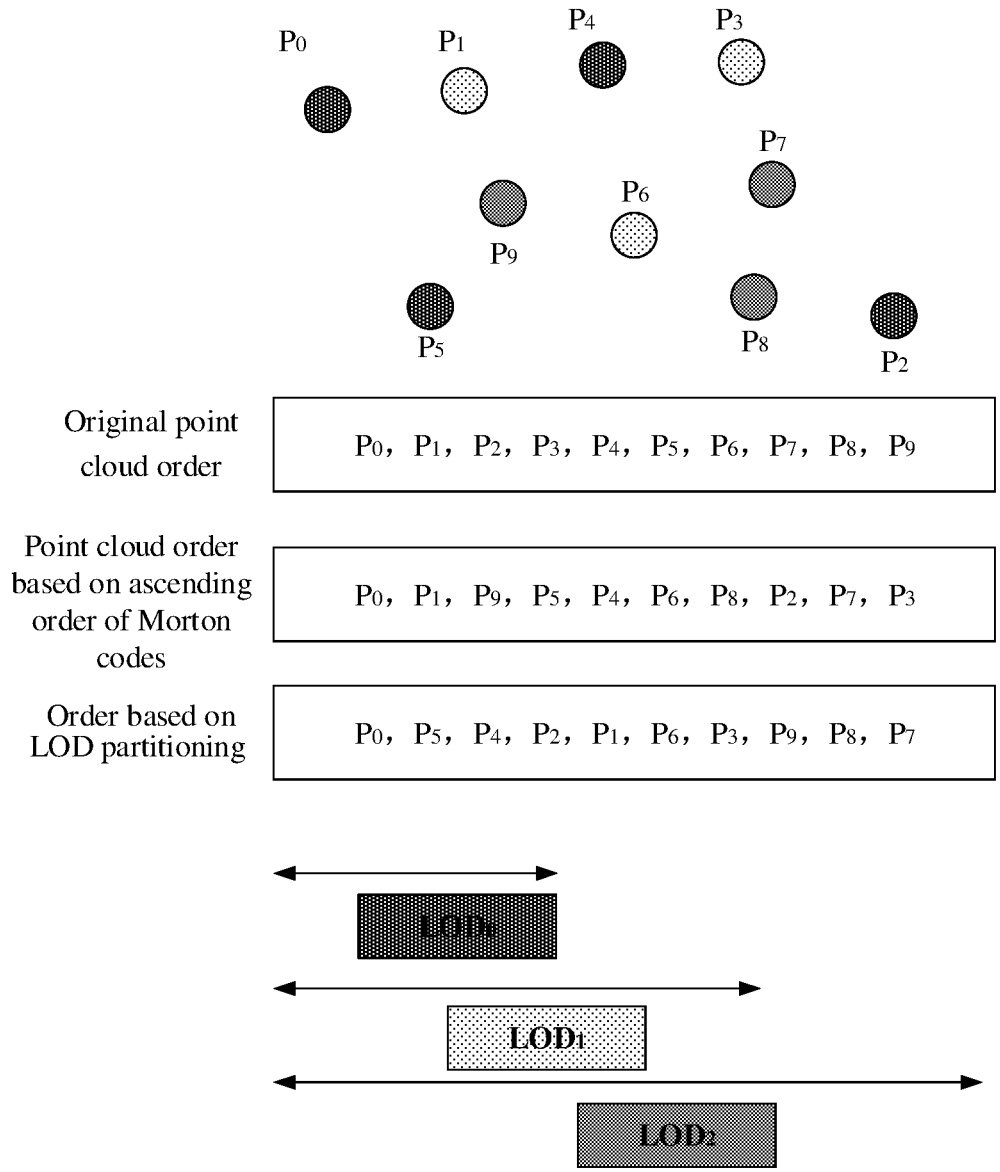
FIG. 5 is a schematic diagram of another structure of generated data of levels according to an exemplary embodiment of the present application.

A process of LOD partitioning based on Morton order is shown in FIG. 5, which is another schematic diagram of a structure of generated data of levels according to an exemplary embodiment of the present application. Points P0 to P9 are points at different positions in the point cloud data, and an original point cloud order of these points is: P0, P1, P2, P3, P4, P5, P6, P7, P8 and P9. Morton codes of these points are arranged in an ascending order: P0, P1, P9, P5, P4, P6, P8, P2, P7 and P3. After the points arranged in the ascending order of Morton codes are partitioned according to LOD using the above first to fourth processings, three levels of data are obtained, namely, the first level is LOD0: P0, P5, P4 and P2; the second level is LOD1: P0, P5, P4, P2, P1, P6 and P3; And the third level is LOD2: P0, P5, P4, P2, P1, P6, P3, P9, P8 and P7.

The present embodiment modifies the generation of LOD in the lifting and prediction attribute transforms, and acts on a codec at the same time. The present embodiment performs LOD structure partitioning in this way before the lifting or prediction transform, which affects the LOD partitioning generation module 310 in FIG. 3.

In related technologies, after LOD partitioning of a point cloud attribute is performed, every time one LOD is partitioned, a nearest neighbor search is performed on the current LOD once. The search way is that for a set arranged in the ascending order of Morton codes, points corresponding to Morton codes around a Morton code of the current point are searched for in a search range of 8, 16, 64 or 128. Then, a distance between each point in the range and the current point is calculated, so as to obtain three nearest neighbors.

Because Morton codes cannot reflect a space distance between the two points well and there is a periodic jump point in the Morton codes, when searching is performed by this way, the adjacency of Morton codes cannot ensure the proximity of spatial positions, it is inaccurate to search for its nearest neighbor around the Morton code of the current point. Moreover, according to a size of the search range, the performance and efficiency change greatly, so search of the nearest neighbors cannot be performed adaptively.

Based on this, a method for nearest neighbor search based on the Morton code is provided in an exemplary embodiment of the present application. By setting a search range (for example, the search range is set as 128) the neighbor range is searched using Morton code, the search range can be narrowed on the premise that the neighbors in the range can be accurately searched out, thereby reducing the number of times of calculating the distances and obtaining better encoding performance and efficiency.

In the process of nearest neighbor search, I (k) refers to a set of predicted points, and O(k) refers to a set of prediction points. During prediction, points in the O(k) are used to predict points in the I (k).

After LOD data are partitioned, all Morton codes of the prediction point cloud set need to be shifted to the right to obtain a parent Morton code set O(k) of the prediction point cloud. The value of Initial right shift digits of the Morton codes in the first level is denoted as N, and then one level LOD is partitioned every time, and all Morton codes in the prediction point set are shifted to the right by 3 digits. In some possible implementations, a size of an initial parent node is determined to be N/3*N/3*N/3 by shifting Morton code to the right by N digits. Further, the size of the initial parent node may be changed by adjusting the value of the right shift digits N, thus achieving the purpose of affecting performance.

Figure 6:
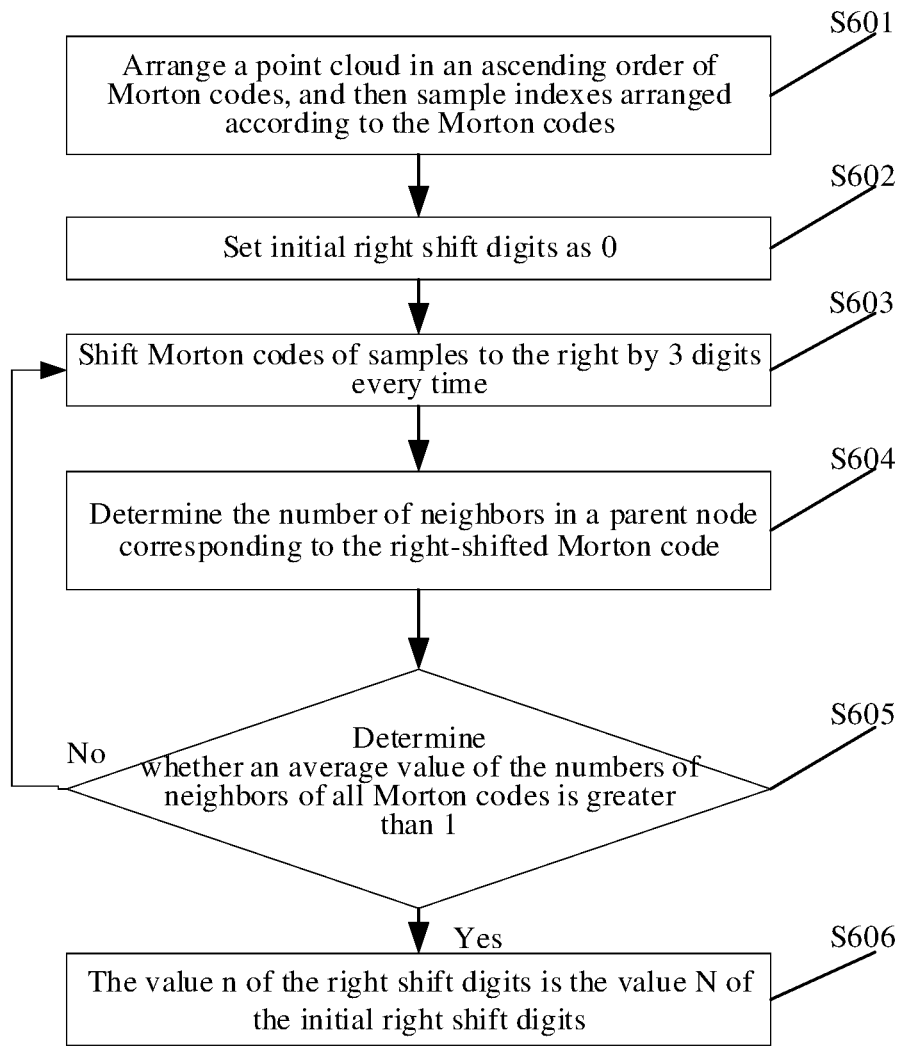
FIG. 6 is a schematic flow chart of an implementation of a method for nearest neighbor search based on Morton code provided in an exemplary embodiment of the present application.

A method for determining initial right shift digits N is shown in FIG. 6 below. FIG. 6 is a schematic flow chart of an implementation of a method for nearest neighbor search based on Morton code provided in an exemplary embodiment of the present application. The following description is made in conjunction with acts shown in FIG. 6.

In act S601, a point cloud is arranged in an ascending order of Morton codes, and then indexes of which the Morton codes are arranged are sampled.

For example, 100 points are selected as samples at equal intervals.

In act S602, initial right shift digits are set as 0.

Herein, the initial right shift digits n are set as 0.

In act S603, Morton codes of samples are shifted to the right by 3 digits every time.

Herein, the initial right shift digits n are set as 0, and then every time one level is partitioned, the samples are shifted to the right by 3 digits.

In act S604, the number of neighbors in a parent node corresponding to the right-shifted Morton code is determined.

In act S605, whether an average value of the number of neighbors of all Morton codes is greater than 1 is determined.

Herein, points, other than the current point, points in the parent node are regarded as neighbors of the current point. When the average value is greater than 1, the process proceeds to act S606, at this time, the right shift digits n are the initial right shift digits N, and the cycle process is ended; otherwise, the process proceeds to act S603, and right shift by 3 digits is continued.

In act S606, the right shift digits n are the initial right shift digits N.

After the LOD level is partitioned, for a predicted point P the Morton code of its parent node may be searched for in O(k) when the nearest neighbor search is performed. As shown in FIG. 7, a block 701 is a parent node of a currently predicted point P. For the current parent node, there are 26 adjacent neighbor parent nodes. A look-up table is established by coordinate differences between the adjacent parent nodes and the current parent node, and Morton codes of the adjacent parent nodes are calculated according to the look-up table. With these Morton codes, indexes corresponding to these neighbor Morton codes may be searched out in O(k), and then points corresponding to the indexes are traversed to find nearest neighbors of the predicted point P. In some embodiments, in addition to 27 neighbor parent nodes including the neighbor parent node itself, neighbor parent nodes coplanar, collinear and co-point with the neighbor parent node, a range of neighbor parent nodes may be expanded or reduced. In this way, the number of neighbors may be expanded outward. Similarly, for selection of neighbors, some of the neighbors may also be selected to perform the nearest neighbor search.

In some embodiments, establishment of a look-up table may also be implemented in the following two modes. In a first mode, a weight of a neighbor may be modified to a specific value, and a table looking-up approach is used, which can reduce a complexity of an algorithm. For example, a weight of each neighbor is set as a distance value from its center point to the current point.

In a second mode, according to Morton code values of a prediction point and a neighbor point, a weight look-up table may be established by calculating their Hamming distance and Morton code difference.

If three neighbors are not searched out in this range, three points in O(k) are forcibly searched for as the nearest neighbors of the point P. In some possible implementations, a method for determining a nearest neighbor is to find three prediction points with smallest distances as neighbors of the predicted point by calculating a distance between the prediction point and the predicted point, and at the same time, the distance between this point and the predicted point is denoted as a weight of the point.

In some embodiments, an order of searching for the nearest neighbors may be in the order of the nearest neighbor itself, nearest neighbors coplanar, collinear and co-point with the nearest neighbor itself. If there are a plurality of neighbors in the neighbor region, neighbors may be selected according to distribution of spatial positions, and three neighbors uniformly distributed in space may be selected to avoid the possibility that three neighbors are on the same side of the predicted point (for example, the three neighbors are adjacent in position).

In some embodiments, if three nearest neighbors are not found in twenty-seven neighbor nodes (including one current point, six coplanar points, twelve collinear points, eight co-point points), the nearest neighbors may be found in the following manners.

1) A traversal range of points away from the point corresponding to a first Morton code in O(k) which is greater than the point P may be expanded from 3 to N.
2) The right shift digits of the Morton codes may be expanded to obtain a larger parent node, so as to searching for neighbors in a larger range.
3) The range of neighbors may be expanded, in addition to these twenty-seven neighbors, more outside neighbors are searched for.

In an exemplary embodiment of the present application, by searching in the parent node region of the predicted point and the neighbor parent node region around the parent node region, the nearest neighbors can be accurately searched out, and a reconstruction quality of an attribute part can be improved, and the encoding and decoding time and encoding and decoding calculation complexity of the attribute can be reduced. As shown in Table 1 below, BD-rate of reconstructed point cloud is obviously improved under a condition of a lossless geometry and a lossy attribute. Peak Signal to Noise Ratio (PSNR) is an objective standard for image evaluation. The larger the PSNR, the better the image quality. A BD-rate is a parameter used for measuring performance. When the BD-rate is negative, it is indicated that performance becomes better. On this basis, the greater the absolute value of BD-rate is, the greater the performance gain is.

TABLE 1

BD-rate under different point cloud files

| Point cloud file | BD-rate | | |
| --- | --- | --- | --- |
| | Y | U | V |
| Long skirt | −3.2% | −4.1% | −4.1% |
| Basketball player | −3.6% | −3.4% | −3.2% |
| Dancer | −3.8% | −3.1% | −3.5% |
| Soldier | −4.2% | −3.1% | −3.7% |

An apparatus for nearest neighbor search is provided in an embodiment of the present application. The apparatus includes various modules and various units included in the modules, which can be implemented by a processor in a computer device. Of course, they may also be implemented by a specific logic circuit. In an implementation process, the processor may be a central processing unit (CPU), a microprocessor (MPU), a digital signal processor (DSP) or a field programmable gate array (FPGA), etc.

Figure 8:
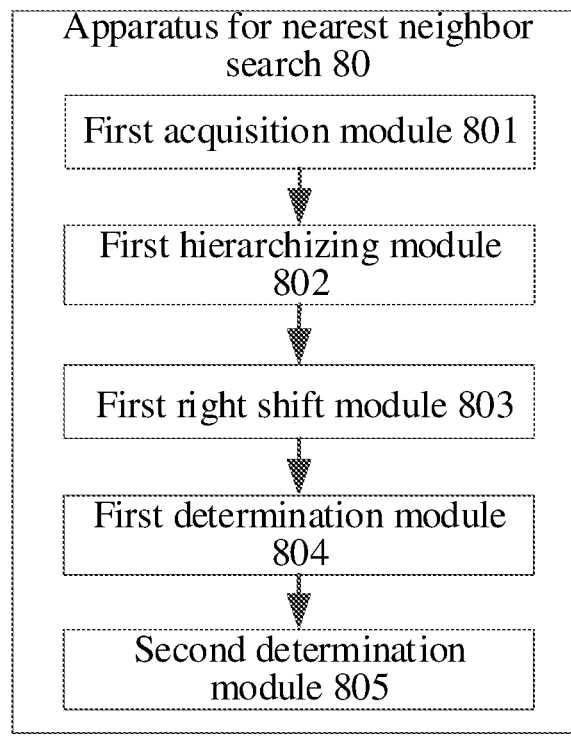
FIG. 8 is a schematic diagram of a structure of an apparatus for nearest neighbor search according to an exemplary embodiment of the present application.

FIG. 8 is a schematic diagram of a structure of an apparatus for nearest neighbor search according to an exemplary embodiment of the present application. As shown in FIG. 8, the apparatus 80 includes a first acquisition module 801, a first hierarchizing module 802, a first right shift module 803, a first determination module 804 and a second determination module 805.

The first acquisition module 801 is configured to acquire a Morton code set of point cloud data to be searched.

The first hierarchizing module 802 is configured to hierarchize the point cloud data according to the Morton code set and a first distance threshold to obtain data of a current level.

The first right shift module 803 is configured to perform right shift of a Morton code of prediction data other than hierarchized data in the point cloud data by first preset digits to obtain a corresponding first parent node set.

The first determination module 804 is configured to determine a neighbor region that satisfies a condition in the first parent node set according to a Morton code of the data of the current level.

The second determination module 805 is configured to determine a set of nearest neighbor points of the data of the current level is in the neighbor region.

In the above apparatus, the first acquisition module 801 includes: a first acquisition sub-module which is configured to acquire point cloud data to be searched; a first determination sub-module which is configured to determine Morton codes of the point cloud data; and a first arrangement sub-module which is configured to arrange the Morton codes of the point cloud data in an ascending order to obtain the Morton code set containing a plurality of Morton codes.

In the above apparatus, the first hierarchizing module 802 includes: a second determination sub-module which is configured to determine a second set at least containing a point corresponding to a Morton code arranged in the first according to the Morton code set; a first storage sub-module which is configured to put the current point into a first set if a distance between a current point currently being processed in the point cloud data and a point in the second set is less than or equal to the first distance threshold; wherein, an initial first set is an empty set; a second storage sub-module which is configured to put the current point is put into the second set to obtain an updated second set if a distance between the current point and a point in the second set is greater than the first distance threshold; and a third determination sub-module which is configured to determine a point in the updated second set of which the distance from the current point is less than or equal to a second distance threshold, to obtain the data of the current level; wherein the first distance threshold is smaller than the second distance threshold.

In the above apparatus, the first right shift module 803 includes: a first right shift sub-module which is configured to perform right shift of a Morton code of a point in the updated second set by second preset digits to obtain a second parent node set; a second right shift sub-module which is configured to perform right shift of a Morton code of a point in the second parent node set by first preset digits to obtain a first parent node set when a level of point cloud data is partitioned from the updated second set.

In the above apparatus, the apparatus further includes a first sampling module, a second right shift module, a third determination module and a fourth determination module.

The first sampling module is configured to sample the Morton code set according to a preset interval to obtain a sample set.

The second right shift module is configured to perform right shift of a Morton code of a point in the sample set by first preset digits to obtain a sampling parent node set; wherein, each sampling parent node corresponds to a right-shifted Morton code.

The third determination module is configured to determine neighbors other than the samples in the region corresponding to the sampling parent node set.

The fourth determination module is configured to determine that the first preset digits are the same as the second preset digits if an average number of neighbors in the sampling parent node set is greater than a preset average threshold.

In the above apparatus, the first determination module 804 includes a fourth determination sub-module, a fifth determination sub-module, a first establishment sub-module, sixth determination sub-module, and a seventh determination sub-module.

The fourth determination sub-module is configured to determine the current parent node to which the current point in the data of the current level belongs in the first parent node set.

The fifth determination sub-module is configured to determine a neighbor parent node set adjacent to the current parent node.

The first establishment sub-module is configured to establish a look-up table according to the neighbor parent node set and the current parent node.

The sixth determination sub-module is configured to determine a Morton code of a neighbor parent node according to the look-up table.

The seventh determination sub-module is configured to determine a region corresponding to the Morton code of the neighbor parent node as a neighbor region that satisfies a condition.

In the above apparatus, the sixth determination sub-module includes a first determination unit which is configured to determine the Morton code of the neighbor parent node according to the look-up table and a coordinate value of the current parent node.

In the above apparatus, the first determination module 804 includes an eighth determination sub-module which is configured to determine an arrangement number of the Morton code of the neighbor parent node in the second set; a ninth determination sub-module which is configured to determine the region corresponding to the Morton code of the neighbor parent node according to the arrangement number; and a tenth determination sub-module which is configured to take at least part of the region occupied by the Morton code of the neighbor parent node as the neighbor region.

In the above apparatus, the first establishment sub-module includes a second determination unit which is configured to determine a difference between a coordinate value of the neighbor parent node and a coordinate value of the current parent node to obtain a difference set; and a first establishment unit which is configured to establish a look-up table according to the difference set and a belonging relationship between the neighbor parent node set and the current parent node; wherein, the belonging relationship is used to indicate that the neighbor parent node set is adjacent to the current parent node.

In the above apparatus, the first establishment sub-module includes a second establishment unit which is configured to establish the look-up table according to a belonging relationship and a distance value from a center point of the neighbor parent node set to a center of the current parent node.

In the above apparatus, the first establishment sub-module includes a third determination unit which is configured to determine a Hamming distance between the neighbor parent node and the current parent node and a Morton code difference between the neighbor parent node and the current parent node according to the Morton code of the neighbor parent node and the Morton code of the current parent node; and a third establishment unit which is configured to establish the look-up table according to the Hamming distance, the Morton code difference and a belonging relationship.

In the above apparatus, the second determination module 805 includes: a first obtaining sub-module which is configured to determine a distance between a point in the neighbor region and a point in the data of the current level, to obtain a distance set; an eleventh determination sub-module which is configured to determine a target distance that is less than a third distance threshold from the distance set; and a twelfth determination sub-module which is configured to determine a set of nearest neighbor points of the current point according to a point corresponding to the target distance.

In the above apparatus, the apparatus further includes a fifth determination module which is configured to determine a point arranged at a preset position from the second set as the set of nearest neighbor points of the current point if the distance set does not contain the target distance that is less than the third distance threshold.

In the above apparatus, the second determination module 805 is configured to determine points corresponding to a smallest distance value, which satisfy a preset number, from points corresponding to the target distance, to obtain the set of nearest neighbor points of the current point.

The description of the above apparatus embodiment is similar to the description of the above method embodiment, and has similar beneficial effects as the method embodiment. For technical details not disclosed in the apparatus embodiment of the present application, please refer to the description of the method embodiment of the present application to understand.

It should be noted that in an exemplary embodiment of the present application, if the above method for nearest neighbor search is implemented in a form of a software function module, and when sold or used as an independent product, it may also be stored in a computer readable storage medium. Based on this understanding, the technical solution in an exemplary embodiment of the present invention, in essence, or a part contributing to the related art, may be embodied in the form of a software product. The computer software product is stored in a storage medium and includes several instructions for enabling a computer device (which may be a personal computer, a server, or a network device, etc.) to perform all or part of the methods described in various embodiments of the present application. And the aforementioned storage medium includes various media which may store program codes, such as a U disk, a mobile hard disk, a Read Only Memory (ROM), a magnetic disk or an optical disk. Therefore, an exemplary embodiment of the present application is not limited to any specific combination of hardware and software.

Figure 9:
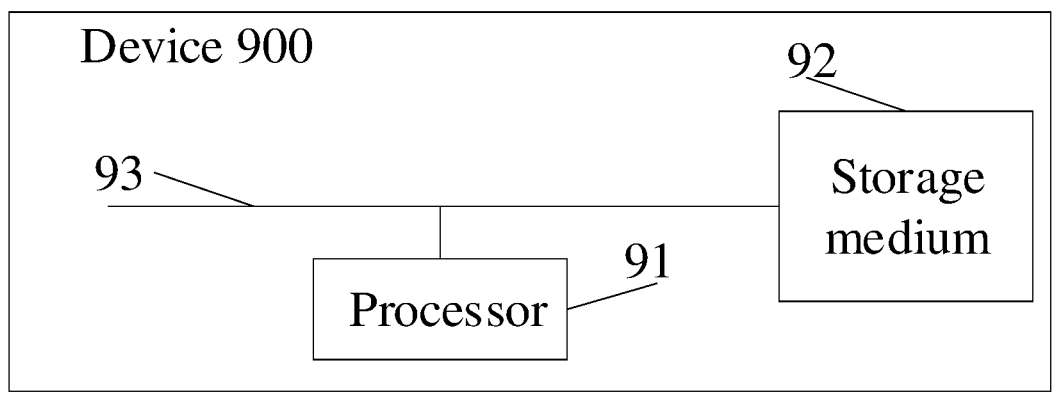
FIG. 9 is a schematic diagram of a device hardware entity according to an embodiment of the present application.

FIG. 9 is a schematic diagram of a device hardware entity according to an exemplary embodiment of the present application. As shown in FIG. 9, a device 900 is provided in an exemplary embodiment of the present application, including: a processor 91 and a storage medium 92 storing instructions executable by the processor 91. The storage medium 92 depends on the processor 91 to execute an operation through a communication bus 93, and when the instructions are executed by the processor 91, the method for nearest neighbor search in the embodiment one is performed.

It should be noted that in practical applications, various components in the device are coupled together through the communication bus 93. It may be understood that the communication buses 93 are used for implementing connections and communications between these components. In addition to a data bus, the communication bus 93 further includes a power bus, a control bus and a status signal bus. However, for the sake of clarity, various buses are labeled as the communication bus 93 in FIG. 9.

Here, it should be noted that the device is usually a mobile device having a front double camera function or a rear double camera function, and the mobile device may be implemented in various forms. For example, the mobile device described in an exemplary embodiment of the present application may include a mobile phone, a tablet computer, a palmtop computer, a Personal Digital Assistant (PDA), and the like.

Correspondingly, a computer readable storage medium is provided in an embodiment of the present application, on which a computer program is stored, wherein when the computer program is executed by a processor, acts in the method for nearest neighbor search provided in the above embodiments are implemented.

It should be pointed out here that the descriptions of the above storage medium and the device embodiments are similar to the description of the above method embodiments, and they have similar beneficial effects as the method embodiments. For technical details not disclosed in the storage medium and the device embodiments of the present application, please refer to the description of the method embodiments of the present application to understand.

It should be understood that "one embodiment" or "an embodiment" mentioned throughout the specification means that a particular feature, a structure, or a characteristic related to the embodiments is included in at least one embodiment of the present application. Thus, "in one embodiment" or "in an embodiment" in the specification may not necessarily refer to the same embodiment. In addition, the particular features, structures, or characteristics may be combined in any suitable manner in one or more embodiments. It should be understood that in various embodiments of the present application, sequence numbers of the various processes do not imply an order of execution of the various processes, which should be determined by their functions and internal logics, but should not constitute any limitation on an implementation process of an exemplary embodiment of the present application. The above-mentioned serial numbers of exemplary embodiments of the present application are only for description, and do not represent superiority and inferiority of the embodiments.

It should be noted that in the present application, the terms "include", "contain" or any other variations thereof are intended to cover a non-exclusive inclusion, such that a process, method, article, or device that includes a list of elements includes not only those elements but also other elements not expressly listed, or further includes elements inherent to such process, method, article, or device. Without more limitations, an element defined by a statement "include one . . . " does not exclude presence of additional identical elements in the process, method, article or system that includes the element.

In several embodiments provided in the present application, it should be understood that disclosed devices and methods may be implemented in another mode. The device embodiments described above are only illustrative, for example, a partition of units is only a logical function partition, and there may be other partition manners in actual implementation. For example, multiple units or components may be combined or integrated into another system, or some features may be ignored or not executed. In addition, mutual coupling or direct coupling or communication connection between various components shown or discussed may be indirect coupling or communication connection between devices or units through some interfaces, and may be electrical, mechanical or in other forms.

The above units described as separate components may or may not be physically separated, and a component shown as the unit may be or may not be a physical unit; it may be located in one place, or may be distributed over multiple network units. Some or all of the units therein may be selected according to an actual requirement to achieve a purpose of the solution of an exemplary embodiment of the present application.

In addition, various functional units in various embodiments of the present application may all be integrated in one processing unit, or each unit may be separately presented as one unit, or two or more units may be integrated in one unit. The above-mentioned integrated units may be implemented in a form of hardware, or in a form of hardware plus software functional units.

One ordinary skilled in the art can understand that, all or part of the acts for implementing the above method embodiments may be accomplished by hardware related to program instructions, and the aforementioned program may be stored in a computer readable storage medium. The program, when executed, performs acts including the above method embodiments. And the aforementioned storage media include: various media which may store program codes, such as a removable storage device, a Read Only Memory (ROM), a magnetic disk, or an optical disk, etc. Alternatively, the integrated units described above in the present application may be stored in a computer readable storage medium, if implemented in a form of software functional module and sold or used as a separate product. Based on this understanding, the technical solution of an exemplary embodiment of the present application, in essence, or the part contributing to the related art, may be embodied in the form of a software product. The computer software product is stored in one storage medium, and includes several instructions to enable a device to perform all or part of the method described in various embodiments of the present application. And the aforementioned storage media includes various media which may store program codes, such as a removable storage device, a ROM, a magnetic disk, or an optical disk, etc. What are described above is merely implementations of the present application, but the protection scope of the present application is not limited thereto. Any variation or substitution that may easily occur to a person skilled in the art within the technical scope disclosed by the present application shall be included within the protection scope of the present application. Therefore, the protection scope of the present application shall be subject to the protection scope of the claims.

INDUSTRIAL APPLICABILITY

A method for nearest neighbor search according to an exemplary embodiment of the present application includes: acquiring a Morton code set of point cloud data to be searched; according to the Morton code set and a first distance threshold, hierarchizing the point cloud data to obtain data of a current level; performing right shift of a Morton code of prediction data other than the hierarchized data in the point cloud data by first preset digits to obtain a corresponding first parent node set; according to a Morton code of the data of the current level, determining a neighbor region that satisfies a condition in the first parent node set; and determining a set of nearest neighbor points of the data of the current level in the neighbor region.

What is claimed is:

1. A method for nearest neighbor search, comprising:
    acquiring a Morton code set of point cloud data to be searched;
    hierarchizing the point cloud data according to a set and a first distance threshold to obtain data of a current level; wherein the set is obtained by arranging Morton codes of the point cloud data in an ascending order;
    performing right shift of a Morton code of data other than hierarchized data in the point cloud data by first preset digits to obtain a corresponding first parent node set;
    determining a neighbor region that satisfies a condition in the first parent node set according to the data of the current level, wherein the neighbor region that satisfies the condition is a neighbor region near a current parent node; and
    determining a set of nearest neighbor points of the data of the current level in the neighbor region and using the determined set of nearest neighbor points for coding the attribute data of the point cloud.

2. The method according to claim 1, wherein, hierarchizing the point cloud data to obtain the data of the current level, comprises:
    determining a second set at least containing a point corresponding to a Morton code arranged in the first according to the set obtained by arranging Morton codes of the point cloud data in an ascending order;
    if a distance between a current point currently being processed in the point cloud data and a point in the second set is less than or equal to the first distance threshold, putting the current point into a first set; wherein, the first set is an empty set;
    if a distance between the current point and a point in the second set is greater than the first distance threshold, putting the current point into the second set to obtain an updated second set; and
    determining a point in the updated second set of which a distance from the current point is less than or equal to a second distance threshold, to obtain the data of the current level;

wherein the first distance threshold is smaller than the second distance threshold.

3. The method according to claim 2, wherein, performing right shift of point cloud data other than the hierarchized data in the point cloud data by the first preset digits to obtain the corresponding first parent node set, comprises:
performing right shift of a point in the updated second set by second preset digits to obtain a second parent node set; and
when a level of point cloud data is partitioned from the updated second set, performing right shift of a point in the second parent node set by the first preset digits to obtain the first parent node set.

4. The method according to claim 3, further comprising:
sampling the Morton code set according to a preset interval to obtain a sample set;
performing right shift of a Morton code of a point in the sample set by the first preset digits to obtain a sampling parent node set; wherein, each sampling parent node corresponds to a right-shifted Morton code;
determining neighbors other than samples in a region corresponding to the sampling parent node set; and
determining that the first preset digits are the same as the second preset digits if an average number of neighbors in the sampling parent node set is greater than a preset average threshold.

5. The method according to claim 2, wherein, determining the neighbor region that satisfies the condition in the first parent node set according to the data of the current level, comprises:
determining a current parent node to which the current point in the data of the current level belongs in the first parent node set;
determining a neighbor parent node set adjacent to the current parent node;
establishing a look-up table according to the neighbor parent node set and the current parent node;
determining a neighbor parent node according to the look-up table; and
determining a region corresponding to the neighbor parent node as the neighbor region that satisfies the condition.

6. The method according to claim 5, wherein determining the neighbor parent node according to the look-up table, comprises:
determining the neighbor parent node according to the look-up table and a coordinate value of the current parent node.

7. The method according to claim 5, wherein, determining the region corresponding to the neighbor parent node as the neighbor region that satisfies the condition, comprises:
determining an arrangement number of the neighbor parent node in the second set;
determining the region corresponding to of the neighbor parent node according to the arrangement number; and
taking at least part of the region occupied by the neighbor parent node as the neighbor region.

8. The method according to claim 5, wherein establishing the look-up table according to the neighbor parent node set and the current parent node, comprises:
determining a difference between a coordinate value of the neighbor parent node and a coordinate value of the current parent node to obtain a difference set; and
establishing the look-up table according to the difference set and a belonging relationship between the neighbor parent node set and the current parent node; wherein, the belonging relationship is used to indicate that the neighbor parent node set is adjacent to the current parent node.

9. The method according to claim 6, wherein establishing the look-up table according to the neighbor parent node set and the current parent node, comprises:
according to a belonging relationship and a distance value from a center point of the neighbor parent node set to a center of the current parent node, establishing the look-up table.

10. The method according to claim 6, wherein establishing the look-up table according to the neighbor parent node set and the current parent node, comprises:
according to a Morton code of the neighbor parent node and a Morton code of the current parent node, determining a Hamming distance between the neighbor parent node and the current parent node and a Morton code difference between the neighbor parent node and the current parent node; and
establishing the look-up table according to the Hamming distance, the Morton code difference and a belonging relationship.

11. The method according to claim 2, wherein determining the set of nearest neighbor points of the data of the current level in the neighbor region, comprises:
determining a distance between a point in the neighbor region and a point in the data of the current level, to obtain a distance set;
determining a target distance that is less than a third distance threshold from the distance set; and
according to a point corresponding to the target distance, determining a set of nearest neighbor points of the current point.

12. The method according to claim 11, further comprising:
if the distance set does not contain the target distance that is less than the third distance threshold, determining a point arranged at a preset position from the second set as the set of nearest neighbor points of the current point.

13. The method according to claim 11, wherein according to the point corresponding to the target distance, determining the set of nearest neighbor points of the current point, comprises:
determining points corresponding to a smallest distance value, which satisfy a preset number, from points corresponding to the target distance to obtain the set of nearest neighbor points of the current point.

14. An apparatus for nearest neighbor search, comprising a processor, wherein the processor is configured to perform the following acts:
acquiring a Morton code set of point cloud data to be searched;
hierarchizing the point cloud data according to a set and a first distance threshold to obtain data of a current level; wherein the set is obtained by arranging Morton codes of the point cloud data in an ascending order;
performing right shift of a Morton code of data other than hierarchized data in the point cloud data by first preset digits to obtain a corresponding first parent node set;
determining, according to the data of the current level, a neighbor region that satisfies a condition in the first parent node set, wherein the neighbor region that satisfies the condition is a neighbor region near a current parent node; and
determining a set of nearest neighbor points of the data of the current level in the neighbor region and using the determined set of nearest neighbor points for coding the attribute data of the point cloud.

15. A device for nearest neighbor search, comprising a memory and a processor, wherein the memory stores a computer program which is runnable on the processor, and acts of the method for nearest neighbor search according to claim 1 are implemented when the processor executes the computer program.

16. A computer readable non-volatile storage medium having a computer program stored thereon, wherein when the computer program is executed by a processor, acts of the method according to claim 1 are implemented.

* * * * *